US012270239B2

(12) United States Patent
Galafassi

(10) Patent No.: US 12,270,239 B2
(45) Date of Patent: Apr. 8, 2025

(54) METHOD AND AN APPARATUS FOR CONTROLLING A MOVEMENT OF AN OUTER BODY PANEL OF A MOTOR VEHICLE

(71) Applicant: FERRARI S.P.A., Modena (IT)

(72) Inventor: Stefano Galafassi, Modena (IT)

(73) Assignee: FERRARI S.p.A., Modena (IT)

( * ) Notice: Subject to any disclaimer, the term of this patent is extended or adjusted under 35 U.S.C. 154(b) by 132 days.

(21) Appl. No.: 18/166,935

(22) Filed: Feb. 9, 2023

(65) Prior Publication Data

US 2023/0313591 A1 Oct. 5, 2023

(30) Foreign Application Priority Data

Feb. 17, 2022 (IT) ........................ 102022000002936

(51) Int. Cl.
*E05F 15/616* (2015.01)

(52) U.S. Cl.
CPC ....... *E05F 15/616* (2015.01); *E05Y 2900/536* (2013.01); *E05Y 2900/546* (2013.01)

(58) Field of Classification Search
CPC ....... E05F 15/616; E05F 15/70; E05F 15/622; E05F 15/77; E05Y 2900/536; E05Y 2900/546; E05Y 2400/32; E05Y 2400/36; E05Y 2400/40; E05Y 2400/44
USPC .................................................. 318/466, 445
See application file for complete search history.

(56) References Cited

U.S. PATENT DOCUMENTS

| | | | | |
|---|---|---|---|---|
| 7,309,971 | B2 * | 12/2007 | Honma | E05F 15/41 318/283 |
| 10,253,544 | B2 * | 4/2019 | Kikuta | H02P 7/05 |
| 2005/0275363 | A1 | 12/2005 | Honma et al. | |
| 2021/0062565 | A1 * | 3/2021 | Joko | B60J 5/106 |

FOREIGN PATENT DOCUMENTS

| | | | |
|---|---|---|---|
| WO | 2020252601 | A1 | 12/2020 |

OTHER PUBLICATIONS

Italian Search Report for Application No. 102022000002936; Filing Date—Feb. 17, 2022; Date of Mailing—Sep. 30, 2022, 13 pages.

* cited by examiner

*Primary Examiner* — David Luo
(74) *Attorney, Agent, or Firm* — CANTOR COLBURN LLP

(57) ABSTRACT

A method for controlling a movement of a hood or of an outer body panel of a motor vehicle, includes the steps of acquiring a first input signal relating to a first quantity indicative of a current position of the hood or of the outer body panel, determining a first reference signal corresponding to a target speed for the movement of the hood or of the outer body panel, determining a first control signal as a function of the determined first reference signal, updating the first control signal as a function of the acquired first input signal, thereby obtaining a second control signal for controlling the actuator device, and controlling the actuator device with the second control signal.

21 Claims, 5 Drawing Sheets

METHOD AND AN APPARATUS FOR CONTROLLING A MOVEMENT OF AN OUTER BODY PANEL OF A MOTOR VEHICLE

CROSS-REFERENCE TO RELATED APPLICATIONS

This patent application claims priority from Italian patent application no. 102022000002936 filed on Feb. 17, 2022, the entire disclosure of which is incorporated herein by reference.

TECHNICAL FIELD

The invention concerns a method and an apparatus for controlling a movement of a hood of a motor vehicle, or more in general of a generic outer body panel, such as for example a door.

PRIOR ART

Usually, a motor vehicle is provided with a body and with at least one hood, for example arranged to cover a trunk.

The hood is typically hinged to the body in a movable manner between two end or end-of-stroke positions, in which it closes and opens the trunk respectively.

In some cases, the hood is handled between the end positions in an automatic manner through an actuator device activated by means of one or more controls available for a driver of the motor vehicle.

In particular, the actuator device is preferably of electric type.

In these cases, the need is generally felt to improve the handling accuracy of the hood, for example with respect to a pre-established trajectory.

More in particular, the need is felt for the handling of the hood to be influenced the least possible by the specific conditions of the motor vehicle, for example dictated by the room temperature, by the state of a battery for supplying the actuator device, by the attitude of the motor vehicle, by the geometric tolerances of the body, by weight variations of the hood, and the like.

An object of the invention is to satisfy at least one of the above-mentioned needs, preferably in a simple, reliable and repeatable manner.

DESCRIPTION OF THE INVENTION

The object is achieved by a method and an apparatus as defined in the independent claims.

The dependent claims set out particular embodiments of the invention.

BRIEF DESCRIPTION OF THE DRAWINGS

In order to better understand the invention, embodiments thereof are described in the following by way of non-limiting example and with reference to the accompanying drawings wherein.

EMBODIMENTS OF THE INVENTION

Figure 1:
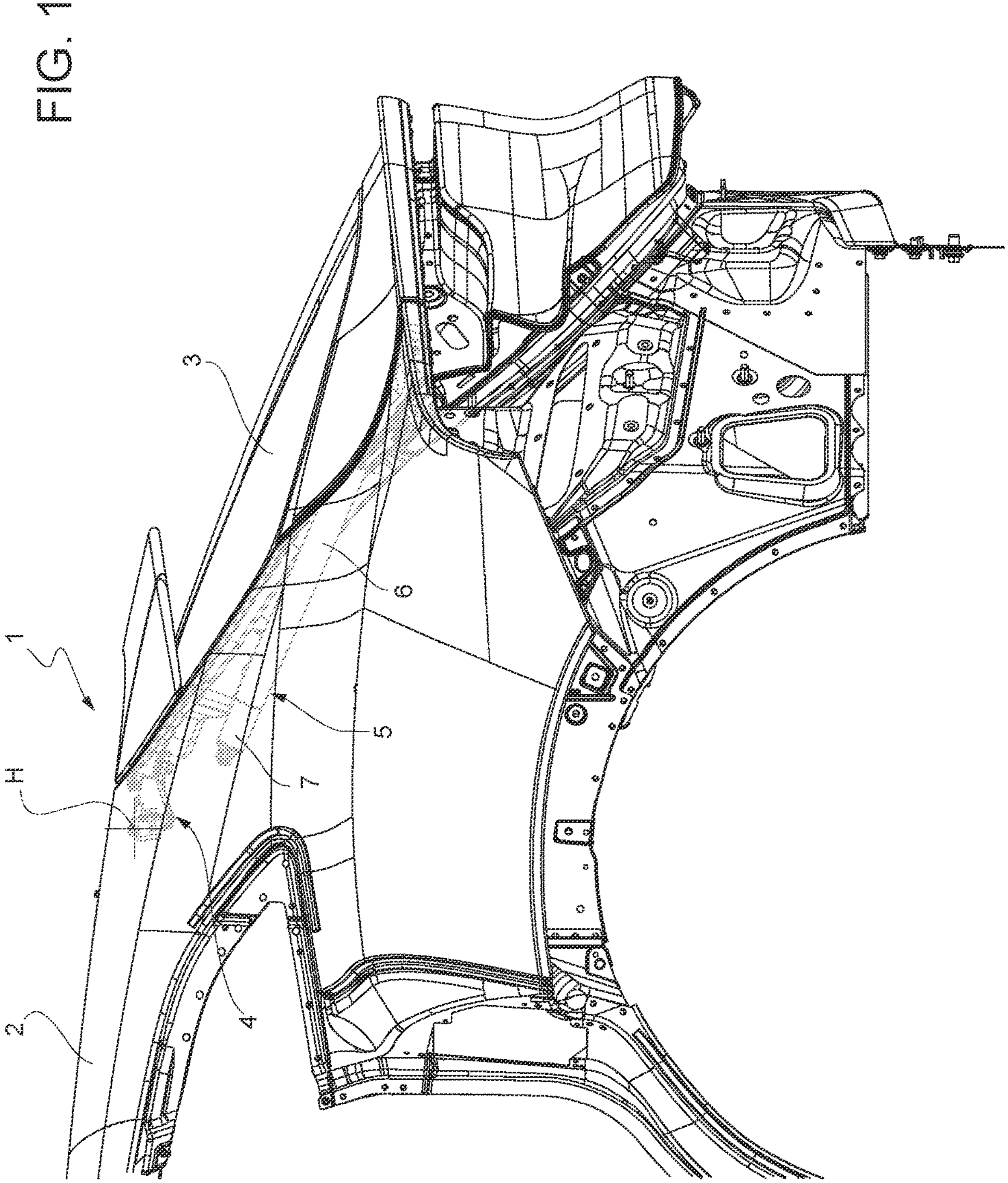
FIG. 1 is a side view, with parts removed for clarity, of a motor vehicle comprising an apparatus according to the invention.
Figure 2:
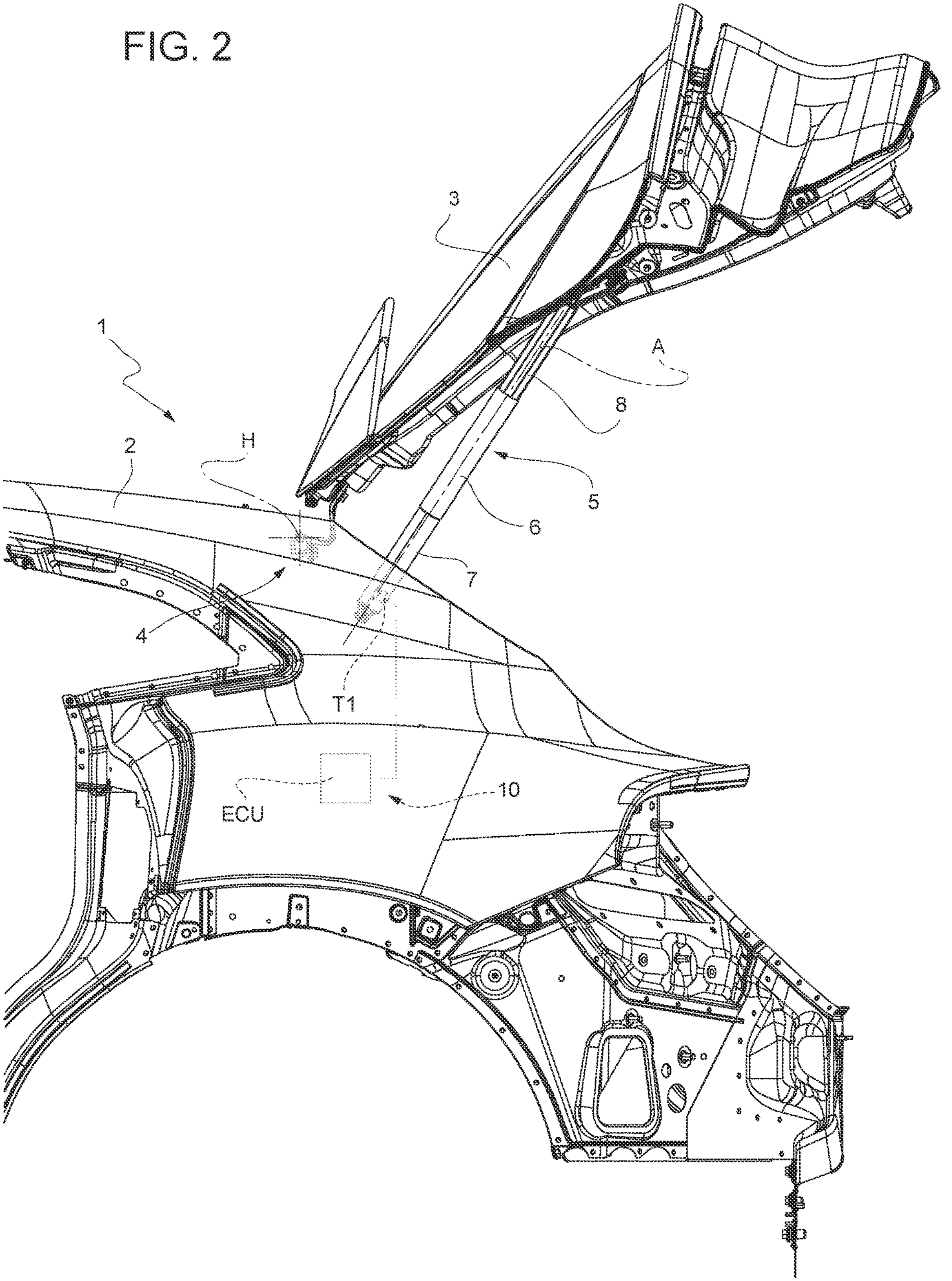
FIG. 2 is similar to FIG. 1 and shows a hood of the motor vehicle in an opening position.
Figure 3:
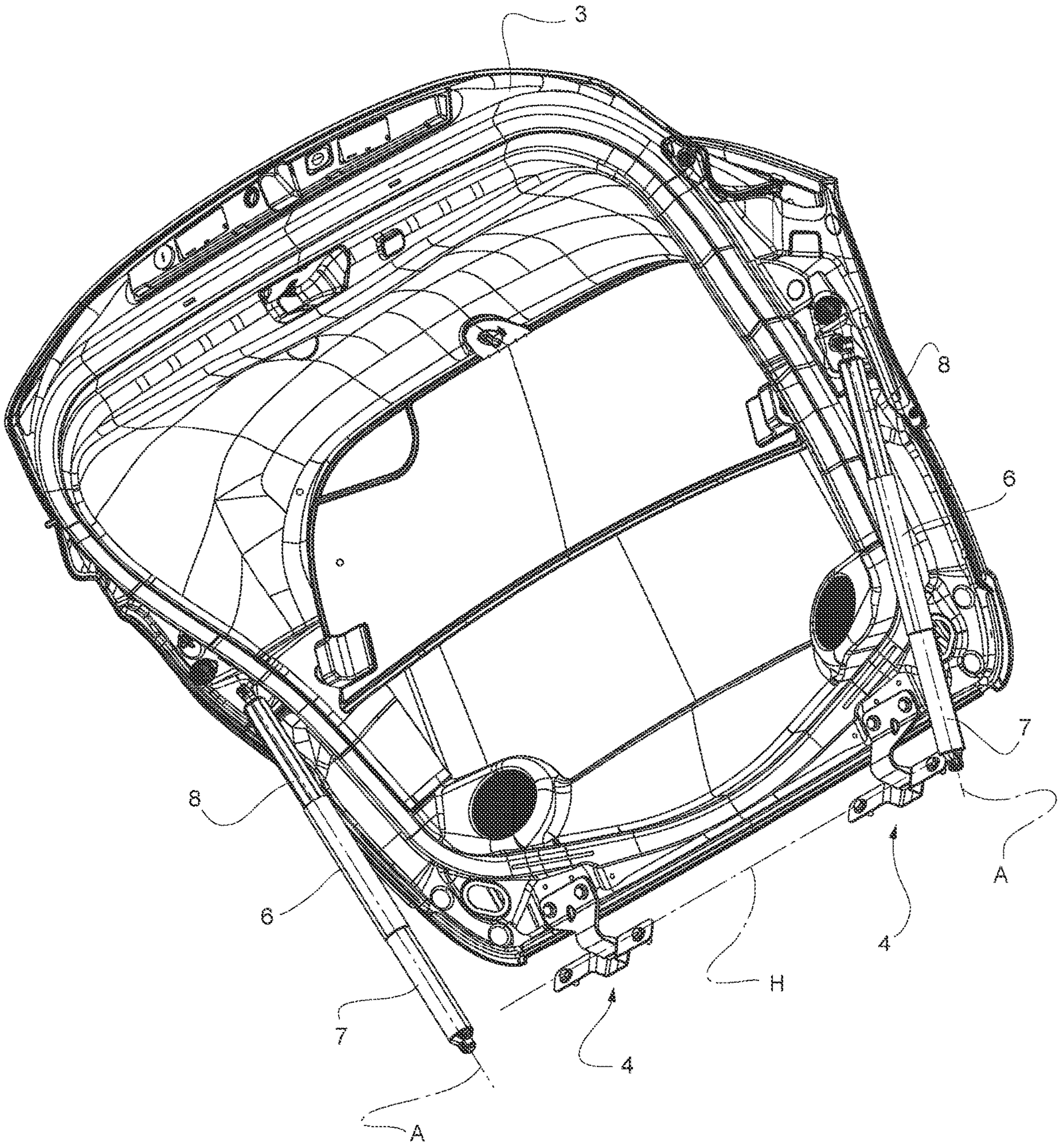
FIG. 3 is a perspective view of the hood of FIG. 2.

In FIG. 1, reference numeral 1 indicates, as a whole, a motor vehicle.

The motor vehicle 1 comprises a body or chassis 2, as well as a hood 3, specifically a rear hood for covering in particular a trunk of the motor vehicle 1.

For the sake of clarity, the terms front and rear refer to the normal forward direction of the motor vehicle 1.

The body 2 defines at least one opening, which in particular allows a communication between an inside and an outside of the motor vehicle 1.

For example, the trunk of the motor vehicle 1 is more in general a compartment inside the motor vehicle 1 which communicates with the outside through the opening defined by the body 2.

The hood 3 is coupled to the body 2 in a movable manner between a closing position, in which the hood 3 closes the opening, and an opening position, in which the hood 3 opens the opening or makes the opening accessible from and towards the outside of the motor vehicle 1.

The closing position and the opening position in particular define two respective end positions or end-of-stroke positions.

Therefore, the hood 3 has a stroke or travel between the closing position and the opening position.

More precisely, the motor vehicle 1 comprises a hinge device 4, for example of known type, through which the hood 3 is coupled to the body 2 in a rotatable manner around an axis H, specifically horizontal and orthogonal to the forward direction of the motor vehicle 1.

Therefore, the hood 3 is rotatable around the axis H between the closing position and the opening position.

The stroke or travel of the hood 3 is a rotation, in particular from the closing position to the opening position or vice versa.

The motor vehicle 1 further comprises an actuator device 5 configured or controllable to move the hood between the closing position and the opening position.

The actuator device 5 is preferably of electric type.

In this specific case, the actuator device 5 comprises at least one linear actuator 6, in particular a pair of linear actuators 6 arranged at respective ends of the hood 3 according to the axis H.

More in particular, each linear actuator 6 comprises a casing 7, a stem 8, and a motor not illustrated, precisely an electric motor, specifically a direct current electric motor.

The casing 7 is coupled to the body 2 in a rotatable manner, for example through a spherical joint of known type and not illustrated. Therefore, at least one point of the casing 7 can be fixed with respect to the body 2.

The stem 8 has an end coupled to the casing 7 in a movable manner along an axis A which is rectilinear and fixed with respect to the casing 7.

Furthermore, the stem 8 has another end opposite the previous one according to the axis A and fixed to a corresponding of the ends of the hood 3 according to the axis H.

The motor is configured or is controllable to move the stem 8 along the axis A.

In particular, the corresponding linear actuator 6 also comprises a transmission not illustrated, for example of the screw-nut screw type, which is configured to transmit or simply transmits an output power of the motor to the stem 8, such that the latter is consequently driven along the axis A.

Each position of the stem 8 corresponds to a position of the hood 3 between the opening position and the closing position, according to a one-to-one relation, more precisely determined by the arrangement of the linear actuator 6 with respect to the body 2 and to the hood 3.

The motor vehicle 1 comprises an apparatus 10 for controlling the movement of the hood 3. The apparatus 10 controls the movement of the hood 3 through the actuator device 5. The apparatus can comprise the actuator device 5. The movement is understood as relating to the body 2.

The apparatus 10 comprises an ECU control unit configured to control the actuator device 5.

More specifically, the ECU control unit is configured to control each linear actuator 6 and in particular the corresponding motor thereof so as to consequently drive the stem 8.

The ECU control unit controls the linear actuators 6 in a coordinated and coherent manner, such that both ends of the hood 3 fixed to the respective stems 8 have the same trajectories.

The ECU control unit is configured to acquire a first input signal S1 relating to a first quantity indicative of a current position of the hood 3.

The first quantity could be the same current position of the hood 3 or one between other quantities associated with it according to respective one-to-one relations, as well as one between quantities which allow an estimate or a calculation of the current position of the hood, in particular through a deterministic or stochastic observer.

For example, the first quantity could be the current position of one of the stems 8 along the corresponding axis A, i.e. with respect to the corresponding casing 7.

Alternatively, the first quantity could be a supply current of the motor, from which the position of the stem 8 along the axis A is observable, for example through a deterministic or stochastic observer.

From this moment onward, all the mentioned signals could be digital signals or signals subject to a sampling process so as to have a sampling time, such that the signals have a plurality of values associated with a respective plurality of sampling instants separate from one another according to the sampling time.

The example in which all the mentioned signals are digital is not strictly limiting but merely exemplifying, since the following teachings can also be applied to analogic signals, i.e. having infinite values associated with a passing of time in a continuous manner.

Preferably, the apparatus 10 comprises a transducer T1 coupled to the ECU control unit. The transducer T1 is configured to detect the first quantity and to generate the relating signal S1.

The ECU control unit acquires the signal S1 from the transducer T1.

In this case, the transducer T1 detects the current position of one of the stems 8 with respect to the corresponding casing 7, to which the transducer T1 is fixed.

For example, the transducer T1 comprises a Hall-effect position transducer.

Furthermore, the ECU control unit (block 101 of FIG. 4) is configured to determine, calculate or generate a first reference signal S2 relating or corresponding to a target speed for the movement of the hood 3.

In particular, the target speed is determined in association with the time or with each sampling instant or sample time, more in particular with an established time interval for producing the movement of the hood 3. The time interval can be chosen a priori and stored by the ECU control unit, or adjusted by the ECU control unit based on operating conditions of the motor vehicle 1 or of any one of the components thereof, i.e. arbitrarily adjusted by a user.

The target speed can be a function of the time or of the sampling time; for example, the target speed has a trend over time corresponding to a speed profile, in particular a trapezoidal speed profile.

The speed profile can be chosen a priori and stored by the control unit, or adjusted by the ECU control unit based on operating conditions of the motor vehicle 1 or of any one of the components thereof, i.e. arbitrarily adjusted by a user.

Preferably, the signal S2 is determined or generated as a function of the signal S1.

In other words, the target speed is determined by the control unit as a function of the position of the hood 3.

This means that the speed profile is variable at least as a function of the signal S1, i.e. of the position of the hood 3.

The ECU control unit can conveniently recalculate or regenerate the signal S2 over time or for each sampling instant or sample time as a function of the value assumed by the signal S1 over time or for such sampling instant or sample time.

Furthermore, optionally, the ECU control unit (block 102 of FIG. 4) is configured to determine, calculate or generate a second reference signal S3 relating or corresponding to a target position for the hood 3.

The signal S3 can be determined as a function of the signal S1 and/or of the signal S2. In other words, the target position is determined by the control unit as a function of the position of the hood 3 and/or of the target speed. This is not limiting, since the signal S3 could be even determined arbitrarily.

In particular, each one of the teachings of the foregoing paragraphs concerning the signal S2 and/or the target speed can be applied, if not otherwise specified, to the signal S3 and to the target position.

More in particular, in the same paragraphs, if not otherwise specified, the expressions signal S2 and target speed can be replaced by the expressions signal S3 and target position respectively.

Therefore, the target position can be associated with the time, with each sampling instant, or with the time interval.

Furthermore, the ECU control unit can conveniently recalculate or regenerate the signal S3 over time or for each sampling instant or sample time.

The target position can also have a trend over time corresponding to a position profile. When the signal S3 is determined as a function of the signal S2, the position profile corresponds to the speed profile since the target speed represents the derivative over time of the target position.

Therefore, the ECU control unit can determine or can be configured to determine the signal S3 carrying out an integral over time of the signal S2 with a setting of an initial condition, for example extracted from the signal S1.

Clearly, the term integral identifies an integration operation which can be continuous or also discrete, i.e. numerical, for example according to known methods, such as the forward Euler method.

Otherwise, when the signal S3 is determined as a function of the signal S1 or in another manner, the ECU control unit determines the signal S2 so that the derivative over time of the target position corresponds to the target speed.

The position profile could be chosen a priori and stored by the control unit, or adjusted by the ECU control unit based on operating conditions of the motor vehicle 1 or of any one of the components thereof, i.e. arbitrarily adjusted by a user.

Figure 4:
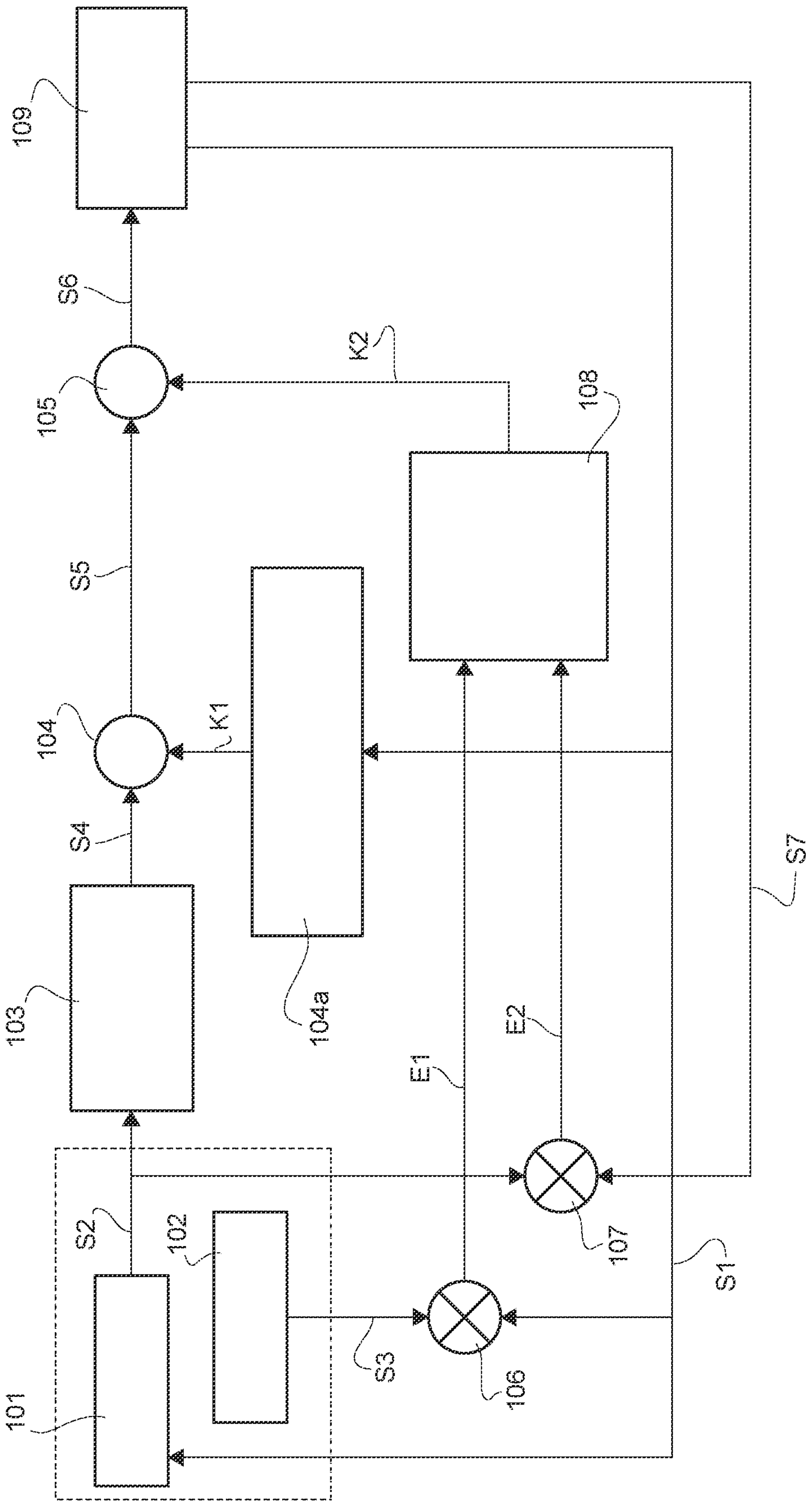
FIG. 4 is a block diagram which illustrates steps of a method according to an embodiment of the invention.

Furthermore, in the embodiment of FIG. 4, the ECU control unit is configured (block 103) to determine or generate a first control signal S4 for controlling the actuator device 5, more precisely for controlling the motors of the linear actuators 6.

For example, the signal S4 could be a current or voltage signal. As is known, the current and voltage signals are normally used for controlling the electric motors.

The signal S4 has at least one property or feature or parameter which would be positively correlated with a power emitted by the actuator device 5 if the latter is actually controlled with the signal S4, i.e. should the actuator device 5 actually receive at the input the signal S4.

In other words, the power emitted would rise with a rise of the mentioned property.

For example, the property could be an average, a frequency, a modulus, an amplitude, an intensity, and the like.

In this case, the ECU control unit controls the actuator device 5 according to a pulse-width modulation technique, also known by the acronym PWM.

Therefore, the signal S4 is in particular a pulse-width modulation signal or PWM signal. Herein, the property is the duty cycle.

In general, the above-mentioned property at least contributes to the determination of the signal S4. Specifically, the property defines the signal S4.

The signal S4 is determined by the ECU control unit as a function of the signal S2.

More specifically, in the embodiment of FIG. 4, the ECU control unit determines the signal S4 by setting the property in a rising manner with the target speed corresponding to the signal S2.

This occurs for each time instant or for each sampling instant or sample time.

For each time instant or for each sampling instant, the value of the property rises with the rising of the value of the target speed at such time instant or sampling instant.

Therefore, the ECU control unit associates the value of the property with the value of the target speed.

For example, the value of the property is associated with the value of the target speed according to a table or a mapping stored by the ECU control unit, for example through interpolation.

The table or the mapping can be obtained, for example, experimentally.

The ECU control unit is configured to update or correct the signal S4 as a function of the signal S1, thereby obtaining a second control signal S6 for controlling the actuator device 5. Therefore, the ECU control unit is configured to actually control the actuator device 5 with the signal S6.

In other words, the signal S4 is corrected based on the current position of the hood 3.

The signal S6 obtained following the correction is received at the input by the actuator device 5, which converts the signal S6 in emitted power.

The updating or correction of the signal S4 comprises a change or adjustment or updating or correction of the above-mentioned property of the signal S4, thus the signal S6 has the above-mentioned property changed or adjusted or updated or corrected.

Clearly, the property is changed in its value and not in its essence. Therefore, the positive correlation between the modified property and the power emitted by the actuator device 5 in response to the signal S6 remains.

Actually, the property of the signal S6 is positively correlated with the power emitted by the actuator device 5 in response to its control through the signal S6.

In fact, in this specific case, the signal S6 is still a PWM signal; the property is still the duty cycle, even if with a changed value with respect to that of the signal S4.

The updating or correction occurs within the scope of the same sampling instant or sample time in which the signal S4 was generated.

In the embodiment of FIG. 4, the updating or correction carried out by the ECU control unit comprises two subsequent steps (blocks 104, 105) of correcting or changing or adjusting the property.

The steps lead to the respective obtainment of an intermediate signal S5 and of the signal S6. The order of the steps could also be inverted, as for example it will be evident in the following.

In block 104, the signal S4 is updated or corrected by the ECU control unit as a function of the signal S1.

Here, the signal S5 is obtained by changing or correcting the property of the signal S4.

In particular, the change or correction occurs by applying a mathematical operation on the value of the property, more in particular by multiplying the value of the property by a factor K1 dependent on the signal S1.

Clearly, the mathematical operation could possibly be different, for example it could be an addition or a division, etcetera.

Therefore, the factor K1 could also be an adding or a dividing factor, instead of a multiplying factor as in the embodiment of FIG. 4.

The factor K1 is determined by the ECU control unit as a function of the signal S1 (block 104*a*).

This occurs for each time instant or for each sampling instant or sample time.

For each time instant or for each sampling instant, the value of the factor K1 is determined or updated as a function of the signal S1 at such time instant or sampling instant.

Therefore, the ECU control unit associates the value of the factor K1 with the value of the signal S1 or of the first quantity indicative of the current position of the hood 3.

For example, the value of the factor K1 is associated with the value of the signal S1 or of the first quantity according to a table or a mapping stored by the ECU control unit, for example through interpolation.

The table or the mapping can be obtained, for example, experimentally.

Conveniently, the updating or correction of the signal S4 occurs differently based on the direction of the movement of the hood 3, i.e. if the movement is a closing movement or an opening movement, i.e. if the movement is directed towards the closing position or towards the opening position respectively.

In particular, when the movement is directed towards the opening position, the updating or correction comprises increasing the value of the property when the signal S1 indicates that the hood 3 is between the closing position and an intermediate position interposed between the closing position and the opening position.

More in particular, the value of the property is increased the more the signal S1 indicates that the hood 3 is close to the closing position. In other words, the increase of the value of the property gradually decreases with the movement of the hood 3 from the closing position to the opening position.

The decrease of the increase is specifically non-linear.

The intermediate position is closer to the closing position than to the opening position; more in particular, the intermediate position is located at less than a third of the stroke or travel of the hood 3.

In other words, the intermediate position is located at less than a third of a movement of the hood 3 from the closing position to the opening position.

Furthermore, independently, the updating or correction comprises decreasing the value of the property when the signal S1 is between the intermediate position and the opening position.

More in particular, the value of the property is decreased the more the signal S1 indicates that the hood is close to a maximum decrease position, interposed between the intermediate position and the opening position.

The maximum decrease position is the one in which the property is decreased the most with respect to all the other positions.

Therefore, the decrease gradually rises with the movement of the hood 3 from the intermediate position to the maximum decrease position.

Then, the decrease gradually lessens with the movement of the hood 3 from the maximum decrease position to the opening position.

Therefore, considering what mentioned above, the factor K1 is greater than one when the movement of the hood 3 is between the closing position and the intermediate position, towards the intermediate position.

More precisely, the factor K1 lessens as the hood 3 draws closer to the intermediate position. The latter phrase could also be true in the case when the factor K1 is not a multiplying factor, but for example an adding factor.

Clearly, whereas if the factor K1 were a dividing or subtracting factor, an opposite or inverse situation would take place.

Furthermore, the factor K1 is equal to one when the hood 3 is in the intermediate position. In other words, in the intermediate position, the increase or the decrease of the value of the property does not occur.

Furthermore, the factor K1 is less than one when the movement of the hood 3 is between the intermediate position and the opening position, towards the opening position.

More precisely, the factor K1 has a minimum at the maximum decrease position, i.e. it lessens as the hood 3 draws closer to the maximum decrease position, to then re-rise as the hood 3 draws closer to the opening position moving away from the maximum decrease position.

The latter phrase could be true also in the case when the factor K1 is not a multiplying factor, but for example an adding factor. Clearly, whereas if the factor K1 is a dividing or subtracting factor, an opposite situation would take place.

On the other hand, when the movement is directed towards the closing position, the updating or correction comprises decreasing the value of the property when the signal S1 indicates that the hood 3 is between the closing position and a further intermediate position interposed between the closing position and the opening position.

The further intermediate position could be identical to the previous one, or different although maintaining the feature of being closer to the closing position, with respect to the opening position, and in particular located at less than a third of the stroke or travel of the hood 3.

In particular, the value of the property is decreased the more the signal S1 indicates that the hood 3 is close to a further maximum decrease position, interposed between the closing position and the further intermediate position.

The further maximum decrease position is the one in which the property is decreased the most with respect to all the other positions.

Therefore, the decrease gradually rises with the movement of the hood 3 from the closing position to the further maximum decrease position.

Then, the decrease gradually lessens with the movement of the hood 3 from the further maximum decrease position to the further intermediate position.

Furthermore, independently, the updating or correction comprises increasing the value of the property when the signal S1 indicates that the hood is between the further intermediate position and the opening position.

More in particular, the hood 3 has at least one maximum increase position, interposed between the further intermediate position and the opening position, in which the property is increased in a maximum manner.

Still more in particular, the hood 3 has a continuous interval of positions, including the maximum increase position, in which the increase of the property is constant and maximum.

Therefore, when the movement of the hood 3 is a closing movement, the factor K1 is less than one when the movement of the hood 3 is between the closing position and the further intermediate position, towards the latter.

More precisely, the factor K1 has a minimum at the further maximum decrease position, i.e. it lessens as the hood 3 draws closer to the further maximum decrease position, to then re-rise as the hood 3 draws closer to the further intermediate position moving away from the further maximum decrease position.

The latter phrase could also be true in the case when the factor K1 is not a multiplying factor, but for example an adding factor.

Clearly, whereas if the factor K1 were a dividing or subtracting factor, an opposite or inverse situation would take place.

Furthermore, the factor K1 is equal to one when the hood 3 is in the further intermediate position. In other words, in the further intermediate position, the increase or the decrease of the value of the property does not occur.

Furthermore, the factor K1 is greater than one when the movement of the hood 3 is between the further intermediate position and the opening position, towards the opening position.

More precisely, the factor K1 has a maximum at the maximum increase position or at the continuous interval of positions.

Furthermore, the ECU control unit is configured (block 106 of FIG. 4) to calculate a position error E1 based on a difference between the signal S1 and the signal S3. More precisely, the position error E1 coincides with such difference.

Conveniently, the ECU control unit can even be configured to determine a second input signal S7 relating to a second quantity indicative of a current speed of the movement of the hood 3. The current speed is more precisely a relative speed with respect to the body 2.

For example, the signal S7 can be determined based on the signal S1, for example since the current speed of the hood 3 represents the time derivative of the current position of the hood 3.

Similarly, the second quantity can represent the time derivative of the first quantity.

Specifically, the signal S7 is determined carrying out a numerical time derivative of the signal S1. In particular, the result of the time derivative is filtered through one or more low-pass filters.

Alternatively, the apparatus 10 can comprise a transducer not illustrated configured to detect the second quantity and generate the relating signal S7.

The transducer can be coupled to the ECU control unit, such that the latter can acquire the signal S7.

For example, the second quantity could be a linear speed of one of the stems 8 along the axis A, or an indicative quantity thereof.

In fact, the current speed of the hood 3 is a direct consequence of the linear speed of the stems 8, in particular according to a one-to-one relation.

The determination of the signal S7 thus occurs through the acquisition of the signal S7.

Preferably, alternatively or additionally to the calculation of the position error E1, the ECU control unit is configured (block 107 of FIG. 4) to calculate a speed error E2 based on a difference between the signal S7 and the signal S2. More precisely, the speed error E2 coincides with such difference.

In the embodiment of FIG. 4, the signal S5 is updated or corrected by the ECU control unit, so as to obtain the signal S6.

Herein, the signal S6 is obtained by changing or correcting the property of the signal S5, changed starting from the signal S4.

The change or correction of the property of the signal S5 comprises changing or correcting the property proportionally to the position error E1.

Again, it is reiterated that changing the property means changing the value thereof, in this case proportionally to the position error E1. The term proportionally herein refers to the fact that the value is changed as a function of the position error E1 multiplied by a proportionality or gain factor.

Alternatively or additionally, the change or correction of the property of the signal S5 can comprise changing or correcting the property proportionally to the speed error E2 and/or to a time derivative of the speed error E2. The term proportionally herein maintains the same meaning of the previous paragraph.

In the specific example of FIG. 4, the ECU control unit is configured (block 108 of FIG. 4) to determine a factor K2, in particular a multiplying factor, as a function of the position error E1 and of the speed error E2 and/or of the time derivative thereof.

In particular, the change or correction of the property of the signal S5 occurs by applying a mathematical operation on the value of the property, more in particular by multiplying the value of the property by the factor K2 (block 105 of FIG. 4).

Clearly, the mathematical operation could possibly be different, for example it could be an addition or a division, etcetera. Therefore, the factor K2 could also be an adding or dividing factor, instead of a multiplying factor as in the embodiment of FIG. 4.

The factor K2 increases with the increase of the position error E1. Furthermore, independently, the factor K2 increases with the increase of the speed error E2 and/or of the time derivative thereof.

Clearly, this is true until the factor K2 is a multiplying or adding factor; if the factor K2 were a subtracting or dividing factor, it would decrease with the increase of the position error E1 and/or of the speed error E2.

For example, the factor K2 could comprise a linear combination of the errors E1, E2, each one multiplied by a corresponding gain.

The signal S6 is thus obtained by multiplying the factor K2 with the property of the signal S5.

In FIG. 4, block 109 represents the actuator device 5 which receives the signal S6. In other words, block 109 corresponds to the ECU control unit which controls the actuator device 5 with the signal S6.

Figure 5:
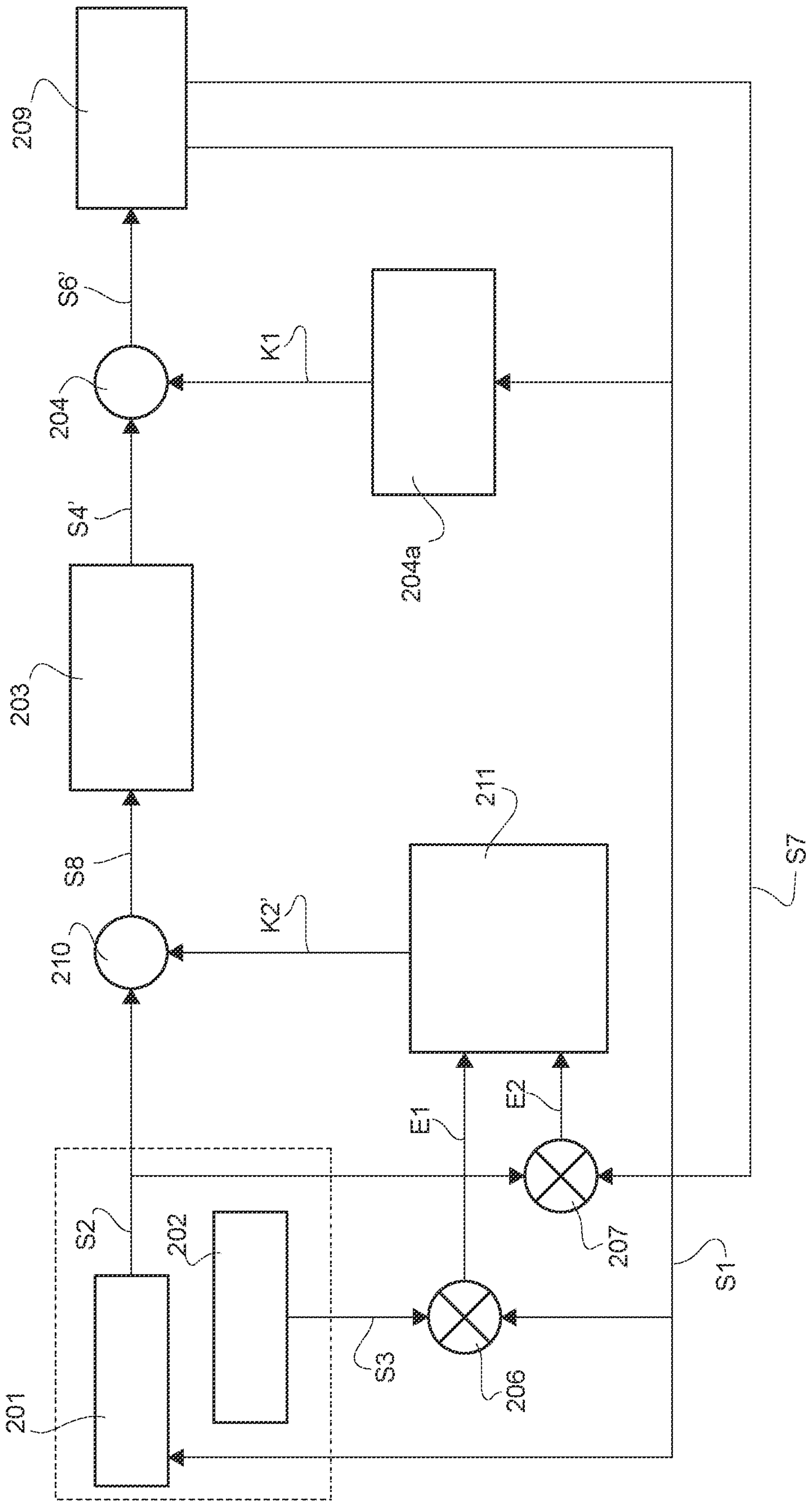
FIG. 5 is a block diagram which illustrates steps of a method according to a further embodiment of the invention.

FIG. 5 illustrates a block diagram according to an embodiment different from the one of FIG. 4 for the different use of the position error E1 and of the speed error E2.

In FIG. 5, the blocks logically similar to the ones of FIG. 4 are indicated by the same reference numerals increased by one hundred, hence block 201 of FIG. 5 will be logically similar to block 101 and so on. The logically similar blocks of FIG. 5 will not be specifically described for the sake of brevity, but their operation is directly inferable from the corresponding blocks of FIG. 4, having made due considerations with respect to the different context.

Furthermore, identical reference symbols identify conceptually similar entities.

Therefore, FIG. 5 will be described only for what distinguishes it from FIG. 4.

In FIG. 5, the position error E1 and/or the speed error E2 are used for changing or correcting the signal S2, instead of being used for changing or correcting the signal S5 of FIG. 4.

Block 105 of FIG. 4 is replaced in FIG. 5 by block 210.

According to block 210, the change or correction of the signal S2 comprises changing or correcting the signal S2 proportionally to the position error E1.

In other words, the value of the signal S2 is changed as a function of the position error E1 multiplied by a proportionality or gain factor.

Alternatively or additionally, the change or correction of the signal S2 can comprise changing or correcting the signal S2 proportionally to the speed error E2 and/or to a time derivative of the speed error E2.

In other words, the value of the signal S2 is changed as a function of the speed error E2 and/or of the time derivative thereof, each one multiplied by a corresponding proportionality or gain factor.

In the specific example of FIG. 5, the ECU control unit is configured (block 211 of FIG. 5) to determine a factor K2', in particular an adding factor, as a function of the position error E1 and of the speed error E2 and/or of the time derivative thereof.

The factor K2' is determined proportionally to the position error E1 and/or to one between or both the speed error E2 and the time derivative thereof.

In particular, the change or correction of the signal S2 occurs by applying a mathematical operation on the value of the signal S2, more in particular by adding the value of the signal S2 by the factor K2' (block 210 of FIG. 5).

Clearly, the mathematical operation could possibly be different, for example it could be a product or a division, etcetera. Therefore, the factor K2' could also be a multiplying or dividing factor, instead of being an adding factor as in the embodiment of FIG. 5.

The factor K2' increases with the increase of the position error E1. Furthermore, independently, the factor K2' increases with the increase of the speed error E2 and/or of the time derivative thereof. Clearly, this is true until the factor K2' is a multiplying or adding factor; if the factor K2' were a subtracting or dividing factor, it would decrease with the increase of the position error E1 and/or of the speed error E2.

For example, the factor K2' could comprise a linear combination of the errors E1, E2, each one multiplied by a corresponding gain.

In this manner, the result of block 210 is a signal S8 corresponding to a modified target speed proportionally to the position error E1 and/or to one or to both the speed error E2 and the time derivative thereof.

The signal S8 is received at the input by block 203, according to which the control unit determines a signal S4' as a function of the signal S8.

The signal S4' is distinguished from the signal S4 of FIG. 4 only because it is determined more specifically as a function of the signal S8, instead of generally as a function of the signal S2. In any case, the signal S4' is still determined as a function of the signal S2, since the signal S3 is a function of the signal S2.

In particular, the signal S4' is determined by setting the property in a rising manner with the modified target speed.

The ECU control unit updates (block 204) the signal S4' as a function of the signal S1, thereby obtaining a signal S6' for controlling the actuator device 5.

In particular, the signal S6' is obtained from the signal S4' in a manner similar to how the signal S5 is obtained from the signal S4 in the embodiment of FIG. 4.

In the embodiment of FIG. 5, the ECU control unit is thus configured to control the actuator device 5 with the signal S6' (block 209).

The ECU control unit thus carries out a method which comprises the following steps:

a. acquiring the signal S1, b. determining the signal S2, c. determining the signal S4 as a function of the signal S2, d. updating the signal S4 as a function of the signal S1, thereby obtaining the signal S6, and e. controlling the actuator device 5 with the signal S6.

Steps a-e are repeated several times in block, specifically for each sampling instant or sample time.

Preferably, the method also comprises one, some or all between the following steps:

g. determining the signal S3 as a function of the first signal S1 and/or of the signal S2, h. calculating the position error E1 based on a difference between the signal S3 and the signal S1, and j. determining the signal S7, k. calculating the speed error E2 based on a difference between the signal S2 and the signal S7.

Conveniently, step d. can comprise one, some or all between the following steps:

f. changing the property of the signal S4, such that the signal S6 has the changed property, i. changing the property proportionally to the position error E1, or changing the signal S2 proportionally to the position error (E1) so as to obtain the signal S8, such that the signal S4 is determined during step c. as a function of the signal S8, in particular by setting the property in a rising manner with the modified target speed, and l. changing the property proportionally to the speed error E2 and/or to a time derivative of the speed error E2, or alternatively m. updating the signal S2 proportionally to the speed error E2 and/or to the derivative of the speed error E2 so as to obtain the signal S8, such that the signal S4 is determined during step c. as a function of the signal S8, in particular by setting the property in a rising manner with the modified target speed.

Possibly, in replacement of step m., the signal S2 is updated during step i. also proportionally to the speed error E2 and/or to the derivative of the speed error E2, hence the obtained signal S8 corresponds to a modified target speed proportionally to the position error E1 and to one between or to both the speed error E2 and the time derivative of the speed error E2.

Based on the foregoing, the advantages of the motor vehicle 1, of the apparatus 10 and of the method according to the invention are evident.

In particular, the applicant experimentally verified that the updating of the signal S4 or of the signal S4' allows increasing the accuracy of the movement of the hood 3 with respect to the target position and to the target speed.

In fact, the updating occurs based on the signal S1 which defines a feedback signal specifically suitable for increasing the accuracy of the control of the movement.

Actually, the parameter K1 is determined according to a table or mapping as a function of the signal S1, where the table or mapping is determined experimentally, with the object to optimize the accuracy of the control.

The updating of the signal S5 with correction of the property proportionally to the errors E1, E2 helps increasing the independence of the movement with respect to environmental or operational conditions of the motor vehicle 1. The correction of the property proportionally to the time derivative of the error E2 increases the readiness of the control.

A similar effect results also more surprisingly from the updating of the signal S2 proportionally to the errors E1, E2.

Finally, it is clear that modifications and variations can be made to the motor vehicle 1 according to the invention, which anyway do not depart from the scope of protection defined by the claims.

In particular, the number of the illustrated and described components could be different. Likewise, the shape of the components could be different with respect to what described and illustrated.

Furthermore, some or all between the signals S4, S5, S6 can be saturated with respect to a maximum value.

The term proportionally can also be replaced by the term in a positively correlated manner or in a rising manner.

Furthermore, each one of the errors E1, E2 and the time derivative of the error E2 can be used singularly and independently for correcting the signal S5 and/or the signal S2, without any loss of generality.

Finally, numeral adjectives such as first, second, third are used for the sake of clarity but must not be considered as strictly limiting.

The embodiments of FIGS. 4, 5 can be combined with one another for obtaining further embodiments included within the scope of the claims.

Finally, the hood 3 could be replaced by a different outer body panel for closing an opening of the motor vehicle 1, among which for example a door, a hatch, or a roof.

The invention claimed is:

1. A method for controlling a movement of a hood (3) or of an outer body panel of a motor vehicle (1), wherein the motor vehicle (1) comprises an actuator device (5) controllable to move the hood (3) or the outer body panel between a closing position, in which the hood (3) or the outer body panel closes an opening of the motor vehicle (1), and an opening position, in which the hood (3) or the outer body panel opens said opening, the method comprising the steps of a. acquiring a first input signal (S1) relating to a first quantity indicative of a current position of the hood (3) or of the outer body panel, b. determining (101, 201) a first reference signal (S2) corresponding to a target speed for the movement of the hood (3) or of the outer body panel, and c. determining (103, 203) a first control signal (S4, S4') suitable for controlling the actuator device (5), as a function of the determined first reference signal (S2), d. updating (104, 105, 204) the first control signal (S4, S4') as a function of the acquired first input signal (S1), thereby obtaining a second control signal (S6, S6') suitable for controlling the actuator device (5), and e. controlling (109, 209) the actuator device (5) with the second control signal (S6, S6').

2. The method according to claim 1, wherein the first reference signal (S2) is determined during step b. as a function of the acquired first input signal (S1).

3. The method according to claim 1, wherein step d. further comprises:

f. changing a property of the first control signal (S4, S4'), such that the second control signal (S6, S6') has said property changed, the property being positively correlated with a power emitted by the actuator device (5) during step e.

4. The method according to claim 3, wherein the second control signal (S6, S6') is a pulse-width modulation signal or PWM signal, the property being a duty cycle of the second control signal (S6, S6').

5. The method according to claim 3, wherein the movement is directed towards the opening position, and wherein step f. comprises increasing a value of the property when the first input signal (S1) indicates that the hood (3) or the outer body panel is between the closing position and an intermediate position interposed between the closing position and the opening position, and decreasing the value of the property when the first input signal (S1) indicates that the hood (3) or the outer body panel is between the intermediate position and the opening position.

6. The method according to claim 5, wherein the value of the property is increased the more the first input signal (S1) indicates that the hood (3) or the outer body panel is close to the closing position, and/or wherein the value of the property is decreased the more the first input signal (S1) indicates that the hood (3) or the outer body panel is close to a maximum decrease position, interposed between the intermediate position and the opening position.

7. The method according to claim 5, wherein the intermediate position is located at less than a third of a movement of the hood (3) or of the outer body panel from the closing position to the opening position, the closing position and the opening position defining two end positions for the hood (3) or the outer body panel, respectively.

8. The method according to claim 3, wherein the movement is directed towards the closing position, and wherein step f. comprises decreasing a value of the property when the first input signal (S1) indicates that the hood (3) or the outer body panel is between the closing position and an intermediate position interposed between the closing position and the opening position, and increasing the value of the property when the first input signal (S1) indicates that the hood (3) or the outer body panel is between the intermediate position and the opening position.

9. The method according to claim 8, wherein the value of the property is decreased the more the first input signal (S1) indicates that the hood (3) or the outer body panel is close to a maximum decrease position, interposed between the closing position and the intermediate position.

10. The method according to claim 3, wherein said property is changed during step f. by multiplying a value of the property by a multiplying factor (K1) depending on the first input signal (S1).

11. The method according to claim 3, further comprising:

g. determining (102, 202) a second reference signal (S3) as a function of the acquired first input signal (S1) and/or of the first reference signal (S2), the second reference signal (S3) corresponding to a target position for the hood (3) or the outer body panel, and h. calculating (106, 206) a position error (E1) based on a difference between the first input signal (S1) and the second reference signal (S3).

12. The method according to claim 11, wherein step d. further comprises:

i. changing (105) said property proportionally to the position error (E1).

13. The method according to claim 11, further comprising:

i. updating (210) the first reference signal (S2) proportionally to the position error (E1), thereby obtaining a third reference signal (S8) corresponding to a modified target speed proportionally to the position error (E1), wherein the first control signal (S4') is determined during step c. as a function of the third reference signal (S8) by setting said property in an increasing manner with the modified target speed.

14. The method according to claim 13, further comprising:

j. determining a second input signal (S7) relating to a second quantity indicative of a current speed of the movement of the hood (3) or of the outer body panel, and k. calculating (107) a speed error (E2) based on a difference between the second input signal (S7) and the first reference signal (S2).

15. The method according to claim 14, wherein the first reference signal (S2) is updated during step i. proportionally to the speed error (E2) and/or to a time derivative of the speed error (E2), whereby the obtained third reference signal (S8) corresponds to the modified target speed proportionally to the position error (E1) and to one between or both the speed error (E2) and the time derivative of the speed error (E2).

16. The method according to claim 3, further comprising:

j. determining a second input signal (S7) relating to a second quantity indicative of a current speed of the movement of the hood (3) or of the outer body panel, and k. calculating (107) a speed error (E2) based on a difference between the second input signal (S7) and the first reference signal (S2).

17. The method according to claim 16, wherein step d. further comprises:

l. changing (105) said property proportionally to the speed error (E2) and/or to a time derivative of the speed error (E2).

18. The method according to claim 16, further comprising:

m. updating (210) the first reference signal (S2) proportionally to the speed error (E2) and/or to a time derivative of the speed error (E2), thereby obtaining a third reference signal (S8) corresponding to a modified target speed proportionally to the speed error (E2) and/or to a time derivative of the speed error (E2), wherein the first control signal (S4') is determined during step c. as a function of the third reference signal (S8) by setting said property in an increasing manner with the modified target speed.

19. The method according to claim 3, wherein the first control signal (S4, S4') is determined during step c. by setting said property in an increasing manner with the target speed.

20. An apparatus (10) for controlling a movement of a hood (3) or of an outer body panel of a motor vehicle (1), the apparatus (10) comprising a control unit (ECU) configured to carry out the method according to claim 1.

21. A motor vehicle (1) comprising a body (2) defining at least one opening, a hood (3) or an outer body panel coupled to the body (2) in a movable manner between a closing position, in which it closes said opening, and an opening position, in which it opens said opening, an actuator device (5) controllable to move the hood (3) or the outer body panel between the closing position and the opening position, and an apparatus (10) according to claim 20.

* * * * *